United States Patent
Mancini et al.

(12)

(10) Patent No.: US 6,435,356 B2
(45) Date of Patent: Aug. 20, 2002

(54) RACK FOR STACKING METAL SECTIONS

(75) Inventors: Bruno Mancini, Bagnolo Mella; Nino Rizzotti, Artegna, both of (IT)

(73) Assignee: Cometal Engineering S.p.A., Rodengo Saiano (Brescia) (IT)

( * ) Notice: Subject to any disclaimer, the term of this patent is extended or adjusted under 35 U.S.C. 154(b) by 0 days.

(21) Appl. No.: 09/832,348

(22) Filed: Apr. 11, 2001

(30) Foreign Application Priority Data

Apr. 12, 2000 (EP) .............................. 00830275

(51) Int. Cl.⁷ ................................ A47F 5/00
(52) U.S. Cl. ................. 211/60.1; 211/190; 211/191
(58) Field of Search ..................... 211/191, 190, 211/60.1, 207, 208, 70.4, 49.1

(56) References Cited

U.S. PATENT DOCUMENTS

| | | | |
|---|---|---|---|
| 1,393,054 A | | 10/1921 | Turner |
| 3,139,187 A | * | 6/1964 | Wolfson et al. ............ 211/60.1 |
| 3,794,183 A | * | 2/1974 | Colbridge |
| 4,030,611 A | * | 6/1977 | Konstant .................... 211/191 |
| 4,223,792 A | * | 9/1980 | Aspen ................... 211/60.1 X |
| 4,541,344 A | * | 9/1985 | Nichols ................... 211/190 X |
| 5,033,584 A | | 7/1991 | Battle ......................... 182/168 |
| 5,509,544 A | * | 4/1996 | Osborn ........................ 211/190 |
| 5,893,468 A | * | 4/1999 | Holmes ...................... 211/60.1 |
| 5,931,320 A | * | 8/1999 | Gaida et al. ............ 211/189 X |
| 6,129,224 A | * | 10/2000 | Mingers ................. 211/190 X |

FOREIGN PATENT DOCUMENTS

| | | |
|---|---|---|
| DK | 172 289 | 11/1977 |
| DK | 88 02 379.6 | 4/1988 |
| EP | 0 585 507 | 3/1994 |
| JP | 52-142360 | 11/1977 |

* cited by examiner

Primary Examiner—Robert W. Gibson, Jr.
(74) Attorney, Agent, or Firm—Arent Fox Kintner Plotkin & Kahn, PLLC

(57) ABSTRACT

Rack (100) for stacking metal sections (105), comprising a plurality of mutually facing frames (110), each frame comprising at least one upright (115a, 115b) and a plurality of cross-pieces (120) extending from the at least one upright to define support surfaces for the sections, at least one further frame (205) associated with each frame, each further frame comprising at least one further upright (210a, 210b) and a plurality of further cross-pieces (215) extending from the at least one further upright and being movable between a rest position in which each further cross-piece is disposed at the same height as a corresponding cross-piece and a working position in which each further cross-piece is disposed at a different height to define further support surfaces for the sections, and means (225a, 225b) for securing the further frames in the rest position or in the working position.

11 Claims, 3 Drawing Sheets

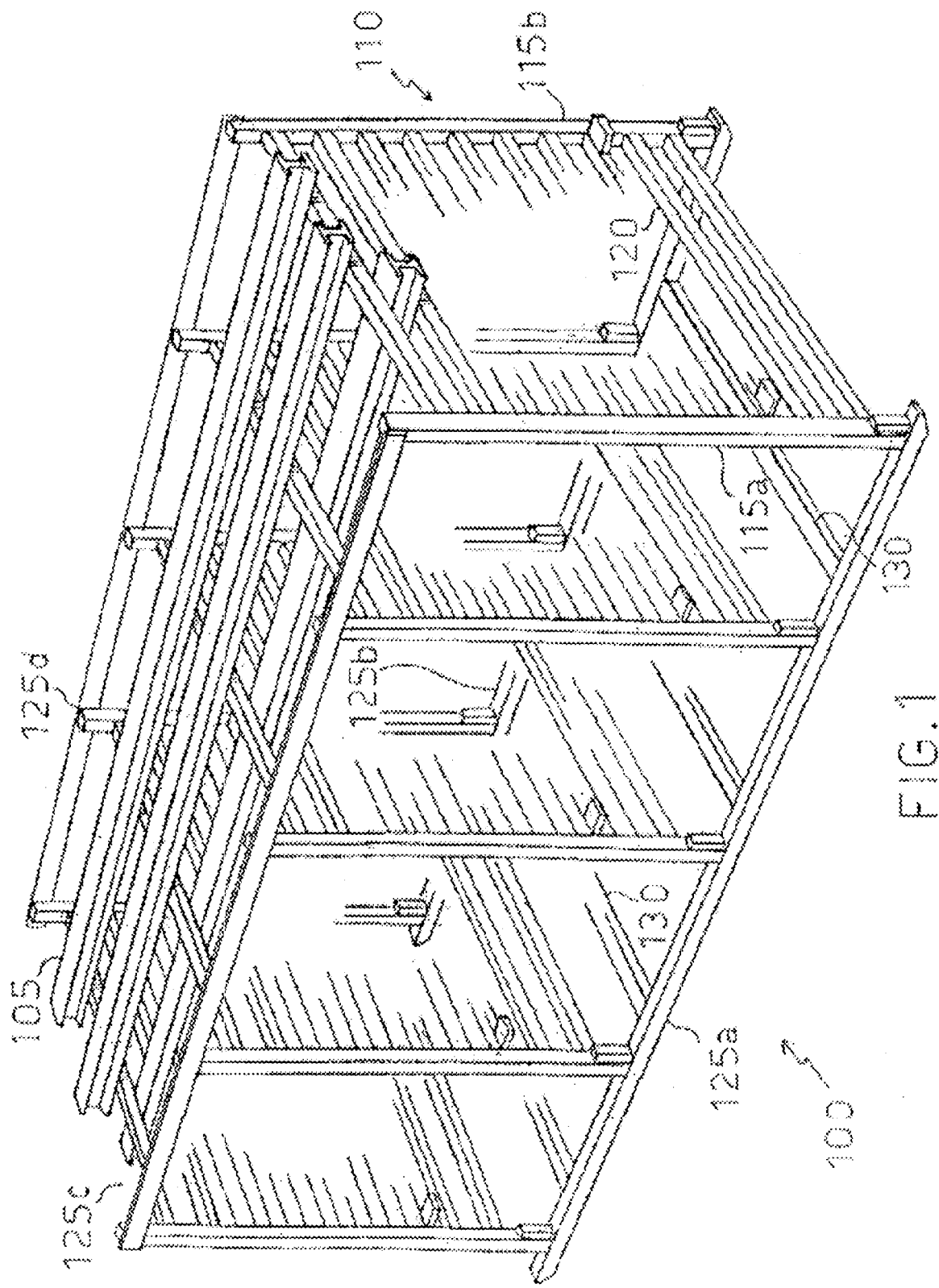

RACK FOR STACKING METAL SECTIONS

FIELD OF THE INVENTION

The present invention relates to a rack for stacking metal sections.

BACKGROUND OF THE INVENTION

Metal sections are in general subjected, during a production cycle, to various stages of processing, as for example heat treatments to improve their mechanical properties. To this end, the sections are stacked together so as to be capable of being transported to a processing station (a furnace in the case in question).

A known solution, described in document EP-A-0585507 comprises arranging the sections on an open rack. The rack is constituted by a plurality of mutually facing vertical frames, each of which is provided with a number of equidistant cross-pieces; the sections are supported horizontally on the corresponding cross-pieces of the frames.

The sections must have a maximum vertical dimension less than the distance between two adjoining cross-pieces of each frame. In order to permit the use of sections of larger dimensions, the above-mentioned document describes a structure in which each cross-piece is hinged on the upright; in this way, the cross-piece may be rotated about the upright to adopt a rest position in which it extends towards the adjacent frame. Alternatively, the said document also proposes the use of cross-pieces that can be removed from the upright.

A disadvantage of the known structure described above resides in the fact that each operation to adjust the rack is somewhat complex and laborious, in that it is necessary to operate individually on each cross-piece (to be rotated or to be removed). Furthermore, in the event that the cross-pieces are hinged on the upright, the cross-pieces are not secured reliably in the rest position, so that they can easily become loose during the transportation of the rack (unloading). On the other hand, the solution using the removable cross-pieces includes cross-piece installation and dismantling operations which require a very large amount of time.

SUMMARY OF THE INVENTION

The object of the present invention is to overcome the above-mentioned drawbacks. In order to achieve this object, a rack is proposed for stacking metal sections as indicated in the first claim.

In brief, the present invention provides a rack for stacking metal sections, comprising a plurality of mutually facing frames, each frame comprising at least one upright and a plurality of cross-pieces extending from the at least one upright to define support surfaces for the sections, at least one further frame associated with each frame, each further frame comprising at least one further upright and a plurality of further cross-pieces extending from the at least one further upright and being movable between a rest position in which each further cross-piece is disposed at the same height as a corresponding cross-piece and a working position in which each further cross-piece is disposed at a different height to define further support surfaces for the sections, and means for securing the further frames in the rest position or in the working position.

Furthermore, the present invention also proposes a corresponding method for adjusting the rack.

BRIEF DESCRIPTION OF THE DRAWINGS

Further features and the advantages of the rack for stacking metal sections according to the present invention will be apparent from the description given below of a preferred embodiment thereof, given by way of indication and without implying any limitation, with reference to the attached drawings in which:

FIG. 1 is a perspective view of the rack,

DETAILED DESCRIPTION OF THE PREFERRED EMBODIMENTS

Figure 2A:
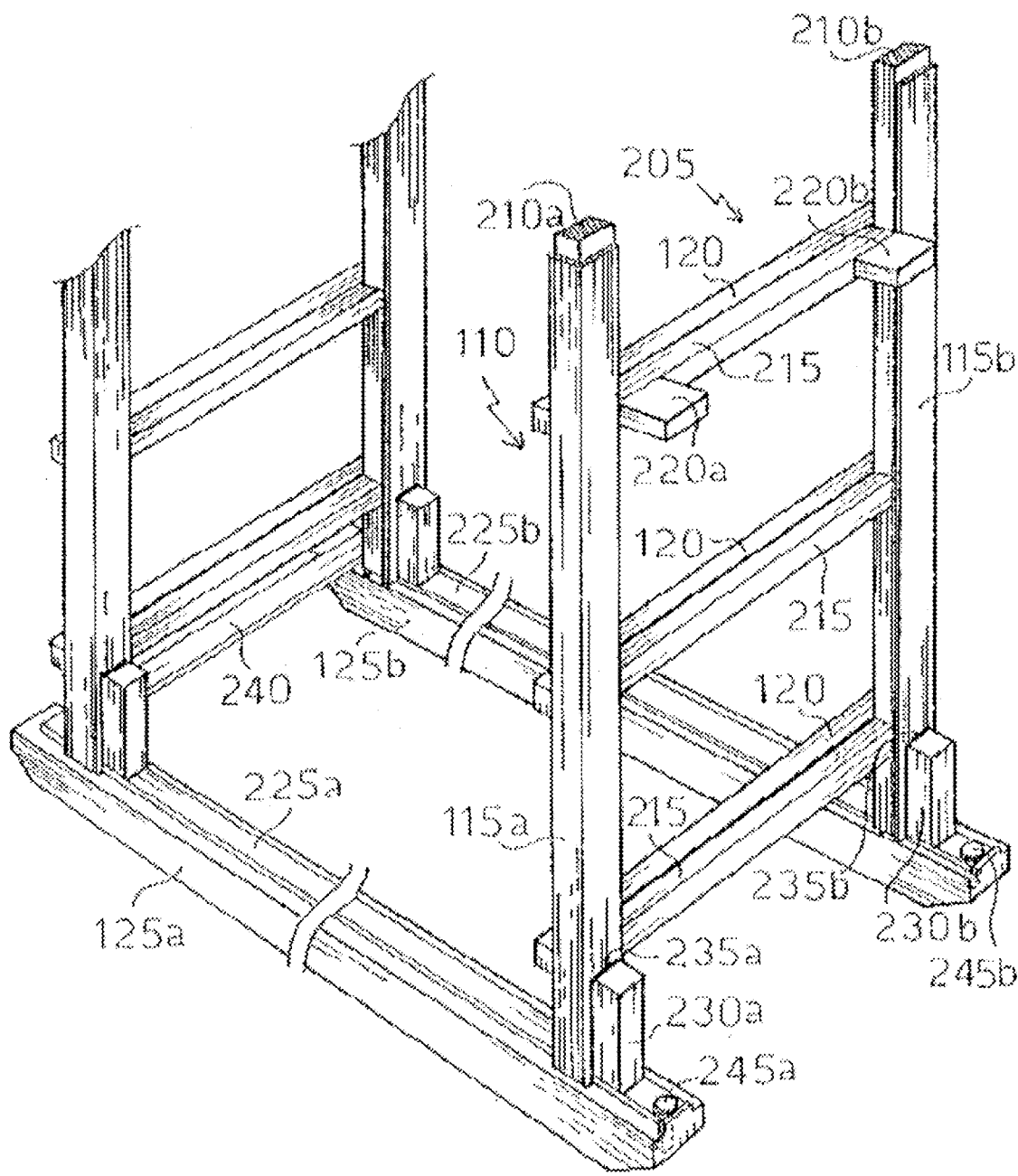
FIGS. 2a and 2b show a detail of the rack in two different operating states.

With particular reference to FIG. 1, a rack 100 is shown, made for example of steel, for metal sections 105. The sections 105 are obtained by an extrusion process, at the end of which they are cut into bars of the desired length. The sections 105 are then subjected to various stages of processing, as for example heat treatments to improve their mechanical properties (strength, hardness) or to obtain artificial ageing. To this end, the sections 105 are stacked on the rack 100 and then transported to a furnace; at the end of the heat treatment, the sections 105 are removed from the rack 100 (so as to be subjected to further processing stages). Typically, the sections 105 are automatically loaded on and unloaded from the rack using corresponding dedicated stations, as described for example in the above-mentioned document EP-A-0585507.

The rack 100 is formed by various mutually facing fixed vertical frames 110 (five in the example shown). Each fixed frame 110 comprises a front upright 115a and a rear upright 115b, between which extends a number of mutually equidistant cross-pieces 120 (for example, about ten). The corresponding cross-pieces 120 of the fixed frames 110 are located at the same height, in a manner such as to define support surfaces for the sections 105 (which support and retain mutually spaced the sections 105).

The fixed frames 110 are connected to one another by two side members 125a and 125b which connect the lower ends, respectively, of the front uprights 115a and of the rear uprights 115b; two further side members 125c and 125d connect the upper ends, respectively, of the front uprights 115a and of the rear uprights 115b. A reinforcing cross-piece 130 extends between the lower side members 125a and 125b in the vicinity of each fixed frame 110. The rack 100 has an overall length slightly less than that of the sections 105 (for example 6–15 m).

Similar considerations apply in the event that the rack is produced from another material, has a different length (if need be, even equal to that of the sections before being cut, for example 60 m), is formed by a different number of fixed frames (if need be, only two), the fixed frames have a different structure (for example a C-shape with a single upright from which the cross-pieces extend in a cantilevered manner), the cross-pieces supporting the sections are of different number and not mutually equidistant, and the like.

In the rack according to the present invention, as described in detail below, one or more further frames (each comprising one or more uprights from which a plurality of cross-pieces extend) are associated with each fixed frame 110. These further frames are movable between a rest position and a working position, and can then be secured in one of the two positions.

In the rest position, each cross-piece of the movable frame is disposed at the same height as a corresponding cross-piece 120 of the fixed frame 110; in this situation, the number of supporting surfaces for the sections is defined solely by the number of cross-pieces 120 (with a maximum height of the sections equal to the distance between two adjacent cross-pieces 120).

In the working position, by contrast, each cross-piece of the movable frame is disposed at a different height, in a manner such as to define further support surfaces for the sections (with a maximum height of the sections that is reduced accordingly).

The solution provided by the present invention enables the rack to be adjusted simply and quickly. This result is obtained by means of an extremely reliable, effective and strong structure.

In the preferred embodiment shown in FIG. 2a, a single movable frame 205 is associated with each fixed frame 110. In particular, the uprights 115a and 115b have a C-shaped section open towards the interior of the fixed frame 110 (formed by an outer wall from which a front side wall and a rear side wall extend perpendicularly); the cross-pieces 120 are welded externally to the rear side walls of the uprights 115a and 115b.

The movable frame 205 comprises a front upright 210a and a rear upright 210b, between which extend a number of mutually equidistant cross-pieces 215; the cross-pieces 215 are equal in number to the cross-pieces 120 minus one. Each upright 210a, 210b is formed by a square bar matching a channel formed by the respective upright 115a, 115b; in this way, the upright 115a, 115b acts as a vertical sliding guide for the upright 210a, 210b. One of the cross-pieces 215 (for example, the third cross-piece from the bottom) is moreover provided with two manoeuvring plates 220a and 220b, which extend horizontally from, respectively, a front end and a rear end of the cross-piece.

A longitudinal member 225a and 225b is supported on the side member 125a and 125b respectively. Each longitudinal member 225a, 225b is formed by a square bar from which one spacer 230a, 230b for each movable frame 205 extends upwards. A window 235a, 235b matching the respective longitudinal member 225a, 225b is formed in the side walls (front and rear) of each upright 115a, 115b. The windows 235a, 235b act as guides for the horizontal sliding of the longitudinal member 225a, 225b; at the same time, the windows 235a, 235b permit each spacer 230a, 230b to be inserted into the respective upright 115a, 115b via the right-hand side wall (coming into abutment against the left-hand side wall).

A manoeuvring cross-piece 240 connects the rear ends of the longitudinal members 225a and 225b. Two blind holes are made in the vicinity of a front end of each side member 125a, 125b along a longitudinal axis thereof; a corresponding through hole is provided in the vicinity of a front end of each longitudinal member 225a, 225b. A securing pin 245a, 245b is inserted into one of the blind holes of the side member 125a, 125b through the through hole in the longitudinal member 225a, 225b.

In a state of rest, as shown in the figure, each longitudinal member 225a, 225b is displaced towards the right, as a result of which the spacers 230a, 230b are outside the corresponding uprights 115a, 115b. The through hole in the longitudinal member 225a, 225b is coaxial with the blind hole to the right of the side member 125a, 125b; the longitudinal member 225a, 225b is thus secured in position by inserting the pin 245a, 245b into the said holes.

The spacers 230a, 230b do not interfere with the respective uprights 210a, 210b. The movable frame 210 is therefore supported on the side members 125a and 125b, as a result of which each cross-piece 215 is disposed at the same height as a corresponding cross-piece 120 (with the exception of a final upper cross-piece 120 with which no cross-piece 215 is associated).

Figure 2B:
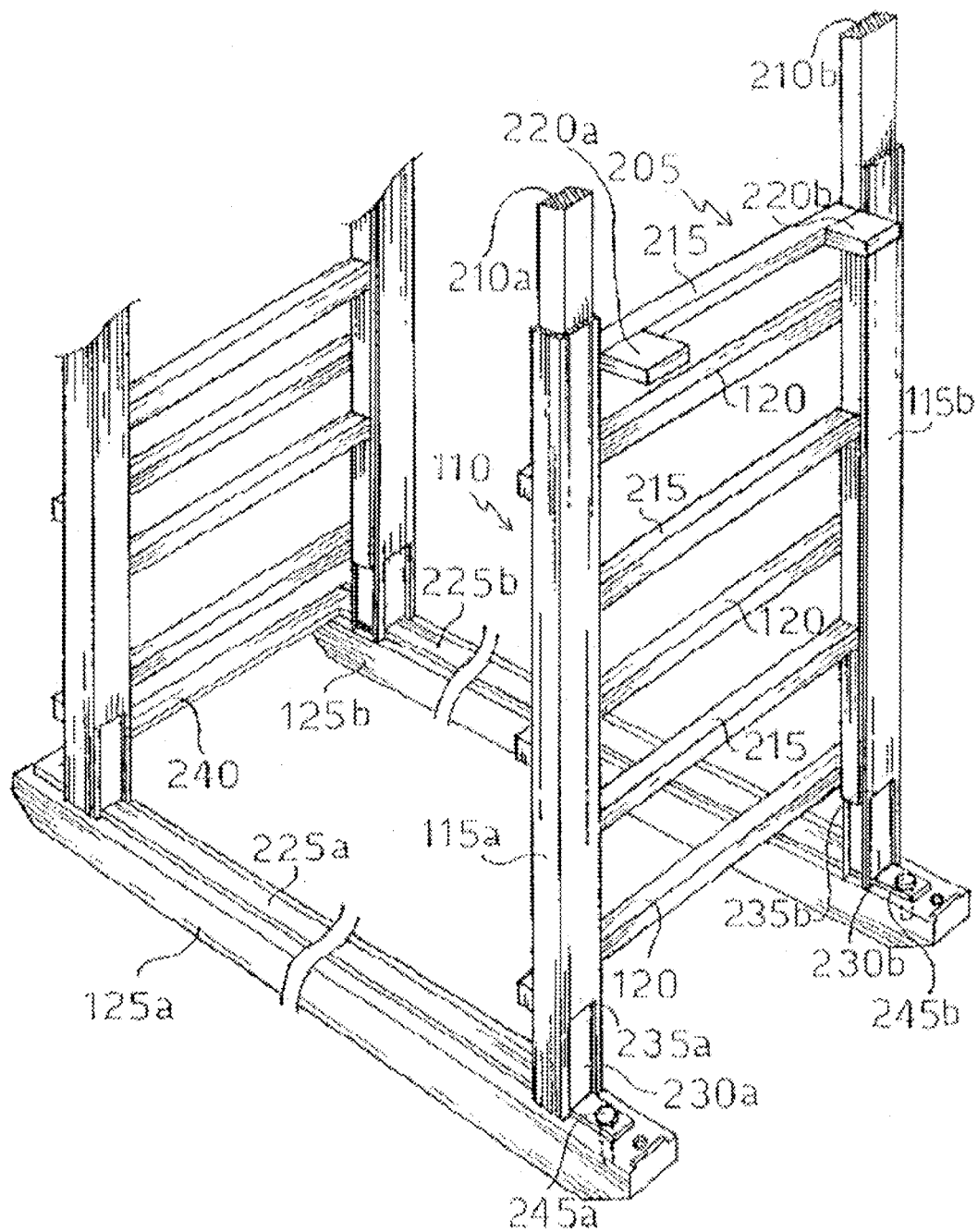

Let is now be supposed that each movable frame 205 is raised by acting on the respective manoeuvring plates 220a, 220b, for example by means of corresponding transport rollers in the loading station. In this working state, as shown in FIG. 2b, each cross-piece 215 is disposed at a different height relative to the corresponding cross-piece 120; in particular, each cross-piece 215 is equidistant from two adjacent cross-pieces 120.

The pins 245a, 245b are then removed, and the longitudinal members 225a, 225b are displaced towards the left, for example by the action of a foot on the manoeuvring cross-piece 240; the spacers 230a, 230b pass through the respective windows 235a, 235b and are disposed below the uprights 210a, 210b in a manner such as to keep them raised. The through hole in the longitudinal member 225a, 225b is now coaxial with the blind hole to the left of the side member 125a, 125b. The longitudinal member 225a, 225b is thus secured in position by inserting the pin 245a, 245b into the said holes.

The cross-pieces 215 define further support surfaces for the sections (with a maximum height of the sections equal to the distance between two adjacent cross-pieces 120 and 215). The number of support surfaces of the rack is thus doubled (with the maximum height of the sections thus being reduced).

The solution described above represents an optimum compromise between the opposing requirements of simplicity and versatility of the structure. This does not exclude, however, the possibility of providing two or more movable frames associated with each fixed frame.

For example, in an alternative embodiment of the present invention, a first movable frame has a structure similar to that of the fixed frame (two open C-section uprights to the outside of which the cross-pieces are welded); the first movable frame (uprights and respective cross-pieces) slides within the uprights of the fixed frame. The uprights of the first movable frame also act as a guide for the sliding of a second movable frame, analogous to the movable frame described above. In this way, by mutually staggering the cross-pieces of each fixed frame and of the respective movable frames, it is possible to treble the number of support surfaces of the rack (with the maximum height of the sections being reduced accordingly).

The particular structure of the frames is extremely simple and, at the same time, strong. This solution is suitable for the most varied and difficult conditions of use, minimizing all maintenance operations.

The manoeuvring plates additionally offer the further advantage of making all operations to adjust the rack very practical; this result is obtained by using simple components which do not in any way increase the bulk of the rack.

The longitudinal members with the associated spacers make it possible to secure the movable frames in the working position and in the rest position in a particularly rapid and secure manner; this also makes it possible to act upon all the movable frames simultaneously with a single securing mechanism.

Similar considerations apply if the cross-pieces of each movable frame are different in number and disposed in a different manner (for example, with the movable frame in the working position when lowered), if a lifting hook is provided for each movable frame or a longitudinal member which makes it possible to act simultaneously on all the movable frames (or other equivalent manoeuvring means), or if the frames have a different structure (for example with the uprights of circular section and provided with a longitudinal slit for the sliding of the cross-pieces of the movable frame, or with the movable frame slidable on the outside of the fixed frame); alternatively, the longitudinal members are secured in the rest position or in the working position by means of a bolt (or other equivalent means), the longitudinal members can be manoeuvred independently, or other means are provided for securing the movable frames, and the like. The rack according to the present invention moreover lends itself to being produced even without any component for manoeuvring the movable frames or for the longitudinal members, or by securing each movable frame individually, for example with a pin inserted into corresponding holes made in the uprights.

Clearly, a person skilled in the art, in order to meet secondary and specific requirements, will be able to make numerous changes and variations to the rack for stacking metal sections as described above, all these however being contained within the scope of protection of the invention as defined in the claims that follow.

That which is claimed is:

1. Rack for stacking metal sections, comprising a plurality of mutually facing frames, each frame comprising at least one upright and a plurality of cross-pieces extending from the at least one upright to define support surfaces for the sections, wherein said rack further comprises at least one further frame associated with each frame, each further frame comprising at least one further upright and a plurality of further cross-pieces extending from the at least one further upright and said further frame being movable between a rest position in which each further cross-piece is disposed at the same height as a corresponding cross-piece and a working position in which each further cross-piece is disposed at a different height to define further support surfaces for the sections, and means for securing the further frames in the rest position or in the working position.

2. Rack according to claim 1, in which the at least one further frame consists of a single further frame and the further cross-pieces of each further frame are equal in number to the cross-pieces of the associated frame minus one, each further cross-piece being equidistant from two adjoining cross-pieces of the associated frame in the working position of the further frame.

3. Rack according to claim 2, in which each upright has a hollow structure which forms a sliding channel for a corresponding further upright.

4. Rack according to claim 3, in which each upright has a C-shaped section open towards the interior of the frame and formed by an outer wall from which two side walls extend perpendicularly, the corresponding cross-pieces being fixed externally to one of the side walls.

5. Rack according to claim 1, in which each further frame includes manoeuvring means for moving the further frame between the rest position and the working position.

6. Rack according to claim 1, in which the securing means include a single securing mechanism for the further frames.

7. Rack according to claim 6, further comprising at least one longitudinal member having a spacer associated with each further frame, the longitudinal member being movable between a rest position in which the spacers do not interfere with the corresponding further frames and a working position in which the spacers hold the corresponding further uprights in a raised position.

8. Rack according to claim 7, further comprising manoeuvring means for moving the at least one longitudinal member between the rest position and the working position.

9. Rack according to claim 7, further comprising means for securing each longitudinal member in the rest position or in the working position.

10. Rack according to claim 8, further comprising means for securing each longitudinal member in the rest position or in the working position.

11. Method of adjusting a rack for stacking metal sections, comprising a plurality of mutually facing frames, each frame comprising at least one upright and a plurality of cross-pieces extending from the at least one upright to define support surfaces for the sections, said method comprising the steps of supplying at least one further frame associated with each frame, each further frame comprising at least one further upright and a plurality of further cross-pieces extending from the at least one further upright, moving each further frame between a rest position in which each further cross-piece is disposed at the same height as a corresponding cross-piece and a working position in which each further cross-piece is disposed at a different height to define further support surfaces for the sections, and securing the further frames in the rest position or in the working position.

* * * * *